(12) United States Patent
van Zelst et al.

(10) Patent No.: US 8,867,565 B2
(45) Date of Patent: Oct. 21, 2014

(54) MIMO AND SDMA SIGNALING FOR WIRELESS VERY HIGH THROUGHPUT SYSTEMS

(75) Inventors: Albert van Zelst, Woerden (NL); Hemanth Sampath, San Diego, CA (US); Didier Johannes Richard van Nee, De Meern (NL)

(73) Assignee: QUALCOMM Incorporated, San Diego, CA (US)

( * ) Notice: Subject to any disclaimer, the term of this patent is extended or adjusted under 35 U.S.C. 154(b) by 413 days.

(21) Appl. No.: 12/433,239

(22) Filed: Apr. 30, 2009

(65) Prior Publication Data

US 2010/0046542 A1 Feb. 25, 2010

Related U.S. Application Data

(60) Provisional application No. 61/090,840, filed on Aug. 21, 2008.

(51) Int. Cl.
*H04J 3/16* (2006.01)
*H04L 1/00* (2006.01)
*H04L 5/00* (2006.01)

(52) U.S. Cl.
CPC ............ *H04L 1/0003* (2013.01); *H04L 1/0057* (2013.01); *H04L 5/0023* (2013.01); *H04L 1/005* (2013.01)
USPC ........................................................ 370/465

(58) Field of Classification Search
USPC .................. 370/465, 344, 334; 455/561, 562
See application file for complete search history.

(56) References Cited

U.S. PATENT DOCUMENTS

| 6,662,024 | B2 * | 12/2003 | Walton et al. | 455/562.1 |
|---|---|---|---|---|
| 6,751,206 | B1 * | 6/2004 | Padovani et al. | 370/335 |
| 7,664,130 | B2 * | 2/2010 | Sakoda et al. | 370/442 |
| 7,751,305 | B2 * | 7/2010 | Jung et al. | 370/203 |
| 2003/0125040 | A1 * | 7/2003 | Walton et al. | 455/454 |

(Continued)

FOREIGN PATENT DOCUMENTS

| EP | 1895680 A2 | 3/2008 |
|---|---|---|
| EP | 1971096 A2 | 9/2008 |

(Continued)

OTHER PUBLICATIONS

CATT, RITT, Views on the High Level Principles of MIMO for unicast traffic in E-UTRA downlink, 3GPP TSG RAN WG1 Meeting #44 R1-060521, Feb. 13, 2006, pp. 1-8.

(Continued)

*Primary Examiner* — Mohammad Anwar
(74) *Attorney, Agent, or Firm* — Eric Ho

(57) ABSTRACT

Apparatuses for communication are disclosed, including processing systems configured to generate and/or receive a plurality of streams, each of the streams having one or more data packets including a plurality of portions, in which each of the portions in each of the data packets is coded and modulated independently of the other portions in the same data packet, the processing systems being further configured to code and modulate and/or decode and demodulate the data packets. Also disclosed are methods for generating and/or receiving a plurality of streams, each of the streams having one or more data packets comprising a plurality of portions, and for coding and modulating and/or decoding and demodulating each of the portions in each of the data packets independently of the other portions in the same data packet.

79 Claims, 7 Drawing Sheets

APPARATUS FOR COMMUNICATION
600

MODULE FOR GENERATING A PLURALITY OF STREAMS, EACH OF THE STREAMS HAVING A DATA PACKET COMPRISING A PLURALITY OF PORTIONS
602

MODULE FOR CODING AND MODULATING EACH OF THE PORTIONS IN EACH OF THE DATA PACKETS INDEPENDENTLY OF THE OTHER PORTIONS IN THE SAME DATA PACKET
604

(56) References Cited

U.S. PATENT DOCUMENTS

| | | |
|---|---|---|
| 2003/0156630 A1 | 8/2003 | Sriram et al. |
| 2006/0203794 A1 | 9/2006 | Sampath et al. |
| 2008/0134002 A1* | 6/2008 | Yang et al. .................... 714/758 |
| 2008/0186934 A1 | 8/2008 | Khan et al. |
| 2009/0219911 A1* | 9/2009 | Blankenship et al. ........ 370/345 |

FOREIGN PATENT DOCUMENTS

| | | |
|---|---|---|
| EP | 1973284 A2 | 9/2008 |
| EP | 2048807 A2 | 4/2009 |
| JP | 2001352251 A | 12/2001 |
| JP | 2006081131 A | 3/2006 |
| JP | 2007509511 | 4/2007 |
| KR | 20080022104 A | 3/2008 |
| TW | 200731716 | 8/2007 |
| TW | M335897 U | 7/2008 |
| TW | M337137 U | 7/2008 |
| WO | 08086074 | 7/2008 |

OTHER PUBLICATIONS

NTT DoCoMo, et al., "Investigation on Optimum Number of Code words for MIMO Multiplexing in E-UTRA Downlink", 3GPP TSG RAN WG1 Meeting #46, Tallinn, Estonia R1-062106, Aug. 28-Sep. 1, 2006.

Qualcomm Europe: "Link Analysis of DL MIMO-Sphere Decoding vs. SIC Receiver", 3GPP TSG-RAN WG1 #46, Tallinn, Estonia, R1-062044, Aug. 28-Sep. 1, 2006.

Samsung: "Performance Evaluation of Multi-User vs. Single User MIMO", 3GPP TSG RAN WG1 Meeting #45 Shanghai, China, R1-061324, May 8-12, 2006.

Taiwan Search Report—TW098128265—TIPO—Aug. 15, 2012.

International Search Report and Written Opinion—PCT/US2009/054265—ISA/EPO—Jan. 27, 2010.

* cited by examiner

APPARATUS FOR
COMMUNICATION
*600*

MODULE FOR GENERATING A PLURALITY OF
STREAMS, EACH OF THE STREAMS HAVING A DATA
PACKET COMPRISING A PLURALITY OF PORTIONS
*602*

MODULE FOR CODING AND MODULATING EACH OF
THE PORTIONS IN EACH OF THE DATA PACKETS
INDEPENDENTLY OF THE OTHER PORTIONS IN THE
SAME DATA PACKET
*604*

FIG. 6

APPARATUS FOR
COMMUNICATION
700

MODULE FOR RECEIVING A PLURALITY OF STREAMS,
EACH OF THE STREAMS HAVING A DATA PACKET
COMPRISING A PLURALITY OF PORTIONS THAT ARE
CODED AND MODULATED INDEPENDENTLY OF THE
OTHER PORTIONS IN THE SAME DATA PACKET
702

MODULE FOR DECODING AND DEMODULATING
THE DATA PACKETS
704

FIG. 7

MIMO AND SDMA SIGNALING FOR WIRELESS VERY HIGH THROUGHPUT SYSTEMS

CROSS-REFERENCE TO RELATED APPLICATIONS

Claim of Priority under 35 U.S.C. §119

The present Application for Patent claims priority to Provisional Application No. 61/090,840, entitled "MIMO AND SDMA SIGNALING FOR 802.11 VERY HIGH THROUGHPUT SYSTEMS," filed Aug. 21, 2008, and assigned to the assignee hereof and hereby expressly incorporated by reference herein.

BACKGROUND

I. Field

The following description relates generally to communication systems, and more particularly to systems and methods for independently coding and modulating separate portions of data packets.

II. Background

In order to address the issue of increasing bandwidth requirements that are demanded for wireless communications systems, different schemes are being developed to allow multiple user terminals to communicate with a single access point by sharing the channel resources while achieving high data throughputs. Multiple Input, Multiple Output (MIMO) technology represents one such approach that has recently emerged as a popular technique for the next generation communication systems. MIMO technology has been adopted in several emerging wireless communications standards such as the Institute of Electrical Engineers (IEEE) 802.11 standard. IEEE 802.11 denotes a set of Wireless Local Area Network (WLAN) air interface standards developed by the IEEE 802.11 committee for short-range communications (e.g., tens of meters to a few hundred meters).

Next generation 802.11 systems will potentially use 8 to 16 transmit antennas. Maximum mean square error (MMSE) successive interference cancellation (SIC) receivers can achieve the capacity of MIMO systems provided a Multi-codeword (MCW) transmitter is used. However, MCW transmitters with MMSE SIC receivers incur prohibitively large memory and complexity, especially when the number of antennas is large. As wireless systems start to grow, there is a need to reduce the large memory requirements and processor complexity.

SUMMARY

In one aspect of the disclosure, an apparatus for communication includes a processing system configured to generate a plurality of streams, each of the streams having a data packet including a plurality of portions, wherein the processing system is further configured to code and modulate each of the portions in each of the data packets independently of the other portions in the same data packet.

In another aspect of the disclosure, an apparatus includes a processing system configured to receive a plurality of streams, wherein each of the streams includes a data packet including a plurality of portions with each of the portions in each of the data packets being coded and modulated independently of the other portions in the same data packet, the processing system being further configured to decode and demodulate the data packets.

In another aspect of the disclosure, a method for communication includes generating a plurality of streams, each of the streams having a data packet including a plurality of portions; and coding and modulating each of the portions in each of the data packets independently of the other portions in the same data packet.

In yet another aspect of the disclosure, a method for communication includes receiving a plurality of streams, wherein each of the streams includes a data packet including a plurality of portions with each of the portions in each of the data packets being coded and modulated independently of the other portions in the same data packet; and decoding and demodulating the data packets.

In another aspect of the disclosure, an apparatus for communication includes means for generating a plurality of streams, each of the streams having a data packet including a plurality of portions; and means for coding and modulating each of the portions in each of the data packets independently of the other portions in the same data packet.

In still another aspect of the disclosure, an apparatus for communication includes means for receiving a plurality of streams, wherein each of the streams includes a data packet including a plurality of portions with each of the portions in each of the data packets being coded and modulated independently of the other portions in the same data packet; and means for decoding and demodulating the data packets.

In another aspect of the disclosure, a computer-program product for communication includes a machine-readable medium encoded with instructions executable to: generate a plurality of streams, each of the streams having a data packet including a plurality of portions, wherein the processing system is further configured to code and modulate each of the portions in each of the data packets independently of the other portions in the same data packet.

In another aspect of the disclosure, a computer-program product for communication includes a machine-readable medium encoded with instructions executable to: receive a plurality of streams, wherein each of the streams includes a data packet including a plurality of portions with each of the portions in each of the data packets being coded and modulated independently of the other portions in the same data packet; and decode and demodulate the data packets.

In another aspect of the disclosure, an access terminal includes a processing system configured to generate a plurality of streams, each of the streams having a data packet including a plurality of portions, wherein the processing system is further configured to code and modulate each of the portions in each of the data packets independently of the other portions in the same data packet; and a user interface supported by the processing system.

In yet another aspect of the disclosure, an access point includes a wireless network adapter configured to support a backhaul connection for a peer node to a network; and a processing system configured to receive a plurality of streams, wherein each of the streams includes a data packet including a plurality of portions with each of the portions in each of the data packets being coded and modulated independently of the other portions in the same data packet, the processing system being further configured to decode and demodulate the data packets.

In another aspect of the disclosure, an access terminal includes a processing system configured to receive a plurality of streams, wherein each of the streams includes a data packet including a plurality of portions with each of the portions in each of the data packets being coded and modulated independently of the other portions in the same data packet, the processing system being further configured to decode and demodulate the data packets; and a user interface supported by the processing system.

In still another aspect of the disclosure, an access point includes a wireless network adapter configured to support a backhaul connection for a peer node to a network; and a processing system configured to generate a plurality of streams, each of the streams having a data packet including a plurality of portions, wherein the processing system is further configured to code and modulate each of the portions in each of the data packets independently of the other portions in the same data packet.

By one or more aspects of the disclosure, a data packet per stream may be broken down into portions and the portions may be coded separately. For aspects utilizing convolutional encoding, tail bits may be added per portion or tail biting per portion may be utilized. Furthermore, a CRC may be added per portion, thereby allowing a receiver to check the CRCs after decoding each portion, thereby providing for an early indication of a packet error. If the receiver determines that the CRC is in error for any portion, the receiver can abort the packet decoding, thereby saving power. Furthermore, by including a CRC in each portion, the receiver can provide a better indication of which portions to resend. By one or more aspects of the disclosure, when LDPC encoding is used for the portions, it inherently provides such a CRC check. Advantages of breaking the data packet up in portions are, amongst others, latency reduction and complexity reduction, because the decoding and interference cancellation can be done in portions, instead of over the entire packet. In some aspects of the disclosure, processing speed is increased toward the end of a packet by reducing the portion sizes towards the end of the packet.

BRIEF DESCRIPTION OF THE DRAWINGS

These and other sample features of the disclosure will be described in the detailed description that follows, and in the accompanying drawings, wherein:

FIG. 6 is a block diagram illustrating an example of the functionality of an apparatus for communication according to an aspect of the disclosure; and FIG. 7 is a block diagram illustrating an example of the functionality of an apparatus for communication according to another aspect of the disclosure.

Figure 1:
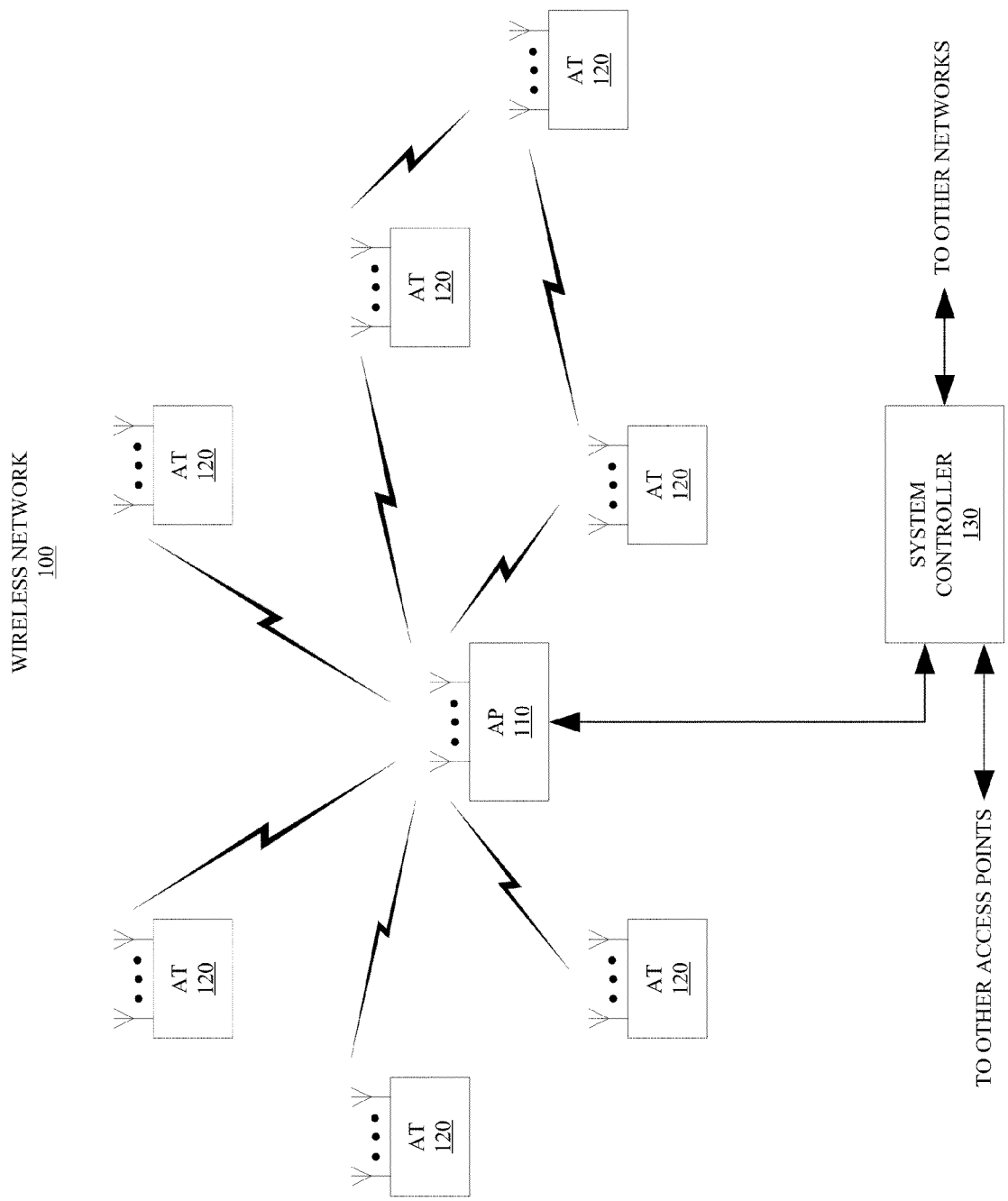
FIG. 1 is a diagram of a wireless communications network.

In accordance with common practice, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of a communication system and process are described more fully hereinafter with reference to the accompanying drawings. This communication system and process may, however, be implemented in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure contained herein may be embodied by one or more elements of a claim.

Several aspects of a wireless network will now be presented with reference to FIG. 1. The wireless network 100 is shown with several wireless nodes, generally designated as nodes 110 and 120. Each wireless node is capable of receiving and/or transmitting. In the detailed description that follows, the term "access point" is used to designate a transmitting node and the term "access terminal" is used to designate a receiving node for downlink communications, whereas the term "access point" is used to designate a receiving node and the term "access terminal" is used to designate a transmitting node for uplink communications. However, those skilled in the art will readily understand that other terminology or nomenclature may be used for an access point and/or access terminal. By way of example, an access point may be referred to as a base station, a base transceiver station, a station, a terminal, a node, an access terminal acting as an access point, or some other suitable terminology. An access terminal may be referred to as a user terminal, a mobile station, a subscriber station, a station, a wireless device, a terminal, a node, or some other suitable terminology. The various concepts described throughout this disclosure are intended to apply to all suitable wireless nodes regardless of their specific nomenclature.

The wireless network 100 may support any number of access points distributed throughout a geographic region to provide coverage for access terminals 120. A system controller 130 may be used to provide coordination and control of the access points, as well as access to other networks (e.g., Internet) for the access terminals 120. For simplicity, one access point 110 is shown. An access point is generally a fixed terminal that provides backhaul services to access terminals in the geographic region of coverage; however, the access point may be mobile in some applications. An access terminal, which may be fixed or mobile, utilizes the backhaul services of an access point or engages in peer-to-peer communications with other access terminals. Examples of access terminals include a telephone (e.g., cellular telephone), a laptop computer, a desktop computer, a Personal Digital Assistant (PDA), a digital audio player (e.g., MP3 player), a camera, a game console, or any other suitable wireless node.

In the detailed description that follows, various aspects of the communication system will be described with reference to a MIMO system (described below) supporting any suitable wireless technology, such as Orthogonal Frequency Division Multiplexing (OFDM). OFDM is a spread-spectrum technique that distributes data over a number of subcarriers spaced apart at precise frequencies. The spacing provides "orthogonality" that enables a receiver to recover the data from the subcarriers. An OFDM system may implement IEEE 802.11, or some other air interface standard. Other suitable wireless technologies include, by way of example, Code Division Multiple Access (CDMA), Time Division Multiple Access (TDMA), or any other suitable wireless technology, or any combination of suitable wireless technologies. A CDMA system may be implemented with IS-2000, IS-95, IS-856, Wideband-CDMA (WCDMA), or some other suitable air interface standard. A TDMA system may implement Global System for Mobile Communications (GSM) or some other suitable air interface standard. As those skilled in the art will readily appreciate, the various aspects of this disclosure are not limited to any particular wireless technology and/or air interface standard.

The wireless network 100 may support MIMO technology. Using MIMO technology, an access point 110 may communicate with multiple access terminals 120 simultaneously, or send multiple data streams simultaneously to an access terminal 120 equipped with multiple antennas, using Spatial Division Multiple Access (SDMA). SDMA is a multiple access scheme which enables multiple streams transmitted to different receivers at the same time to share the same frequency channel and, as a result, provide higher user capacity. This is achieved by spatially preceding each data stream and then transmitting each of the resulting streams after spatial precoding through a different transmit antenna on the downlink. A form of spatial precoding for SDMA results therein that each data stream is received at a different receive antenna, although a one to one correspondence between data streams and receive antennas is not necessary. For example, a MIMO communication system may employ multiple ($N_T$) transmit antennas and multiple ($N_R$) receive antennas for data transmission. A MIMO channel formed by the $N_T$ transmit and $N_R$ receive antennas may be decomposed into $N_S$ independent channels, with $N_S<=\min\{N_T, N_R\}$. Each of the $N_S$ independent channels may also be referred to as a spatial subchannel (or a transmission channel) of the MIMO channel. For a full-rank MIMO channel, where $N_S=N_T<=N_R$, an independent data stream may be transmitted from each of the $N_T$ transmit antennas. When both an access point 110 and access terminal 120 are equipped with multiple antennas ($N_T$ and $N_R$), data throughput may be improved without additional bandwidth or transmit power. This may be achieved by splitting a high data rate signal at the transmitter into multiple lower rate data streams with different spatial signatures, thus enabling the receiver to separate these streams into multiple channels and properly combine the streams to recover the high rate data signal.

Figure 2:
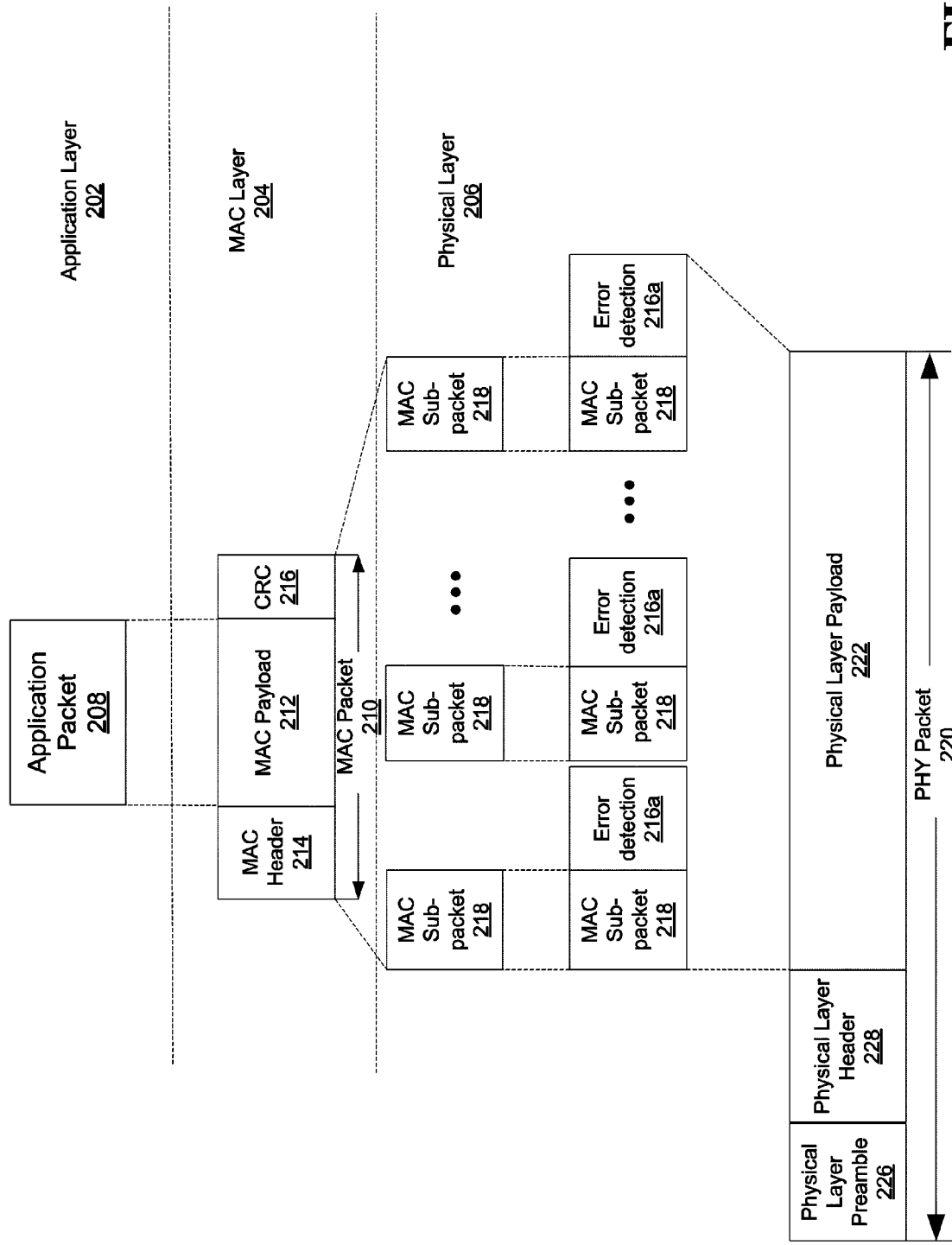
FIG. 2 is a frame structure of a protocol for a wireless node in the wireless communications network of FIG. 1.

A wireless node, whether an access point or access terminal, may be implemented with a protocol that utilizes a layered structure as shown, by way of example, in FIG. 2. The layered protocol structure may include a physical (PHY) layer 206 that implements all the physical and electrical specifications to interface the wireless node to the shared wireless channel, a Medium Access Control (MAC) layer 204 that coordinates access to the shared wireless channel, and an application layer 202 that performs various data processing functions including, by way of example, speech and multimedia codecs and graphics processing. The PHY layer 206 of the protocol is responsible for providing various signal processing functions (e.g., modulating, coding, spatial processing, etc.), as described below. Additional protocol layers (e.g., network layer, transport layer) may be required for any particular application. In some configurations, the wireless node may act as a relay point between an access point and access terminal, or two access terminals, and therefore, may not require an application layer. Those skilled in the art will be readily able to implement the appropriate protocol for any wireless node depending on the particular application and the overall design constraints imposed on the overall system.

When the wireless node is in a transmit mode, the application layer 202 processes data, segments the data into packets, and provides the data packets to the MAC layer 204. The MAC layer 204 assembles a MAC packet 210 with a data packet from the application layer being carried by the payload 212 of a MAC packet 210. Alternatively, the payload for a MAC packet 210 may carry a fragment of a data packet or multiple data packets from the application layer 202. Each MAC packet 210 includes a MAC header 214 and may include an error detection code 216. The MAC packet 210 is sometimes referred to as a MAC Protocol Data Unit (MPDU), but may also be referred to as a frame, data packet, timeslot, segment, or any other suitable nomenclature.

When the MAC decides to transmit, it provides at least one MAC packet 210 to the physical (PHY) layer 206. At the PHY layer 206, the data (or MAC) packet 210 is divided into multiple portions or "subpackets" 218 and an error detection code 216a can be added to each of the subpackets 218 so that the receiver can determine whether each subpacket 218 was decoded successfully (explained in greater detail below). The error detection code 216a added to each individual subpacket 218 may be a cyclic redundancy check (CRC), checksum, parity, a low density parity code (LDPC), or some other suitable error detection code.

The subpackets 218 are assembled into a PHY layer payload 222, to which a PHY layer preamble 226 and/or a PHY layer header 228 is appended to create a PHY layer packet 220. The payload for a PHY layer packet 220 may carry some or all of the portions (subpackets) of one or more MAC packets. The PHY layer preamble 226, which is sometimes referred to as Physical Layer Convergence Protocol (PLCP) preamble, may be used by the receiving node to detect the start of the PHY packet 220 and synchronize to the transmitter's node data clock. The PHY layer header 228 may be used to provide other information such as the number of subpackets 218, the modulation and coding scheme used to code and modulate each of the subpackets 218, the number of OFDM symbols per packet and/or subpacket, and/or other information for demarcating and decoding each of the subpackets 218 included in the PHY layer payload 222. The PHY packet 220 is sometimes referred to as a Physical Layer Protocol Data Unit (PPDU), but may also be referred to as a frame, packet, timeslot, segment, or any other suitable nomenclature.

When the wireless node is in a receive mode, the process described above is reversed. That is, the PHY layer 206 that detects an incoming PHY packet 220 from the wireless channel. The header and/or preamble (228, 226) allow the PHY layer 206 to lock in on the PHY packet 220 and the subpackets 218 and perform various signal processing functions (e.g., demodulating, decoding, spatial processing, etc., described in greater detail below) which are the reverse of those performed when the wireless node is in a transmit mode. Once a subpacket 218 is decoded, the error detection code 216a in that subpacket 218 may be used to determine whether the subpacket 218 was decoded correctly. Once processed, the PHY layer 206 recovers the subpackets 218 carried in the payload of the PHY packet 222, reassembles the subpackets 218 into one or more MAC packets 210, and provides the MAC packet(s) 210 to the MAC layer 204.

The MAC layer 204 checks the error detection code 216a for each reassembled MAC packet 210 to determine whether it was successfully decoded. If the error detection code 216a for a MAC packet indicates that it was successfully decoded, then the payload for the MAC packet 210 is provided to the application layer 202. If the error detection code 216a for a MAC packet 210 indicates that it was unsuccessfully decoded, the MAC packet 210 is discarded or just the corresponding MAC subpackets 218 are discarded. An acknowledgement (ACK) may be sent back to the transmitting node indicating which data packets were successfully decoded. The transmitting node uses the ACK to determine which data packets, if any, require retransmission. In some configurations, an ACK is sent only if each of the subpackets 218 is determined to have been decoded correctly. In such configurations, no ACK is sent if any of the subpackets of a MAC packet 210 is determined to have been corrupted during transmission. In some configurations, a separate ACK is sent for each successfully decoded subpacket. In such configurations, only subpackets not decoded correctly may require retransmission. In some cases, subpackets 218 requiring retransmission may be grouped together in a MAC packet 210. In some configurations, an ACK mechanism provides information for each reassembled MAC packet 210 indicating which subpackets were decoded successfully and which were not.

In some cases, subpackets 218 are coded using a convolutional code. When a convolutional code is employed, tail bits may be added to the subpackets. The tail bits may be all zeros, as in a "zero-tail code," and are used to return the encoder to the zero state, such that the decoding process at the receiver can be initiated from the zero state. By adding the tail bits to the end of each subpacket 218, the encoder is returned to the zero state before every subpacket 218. Thus, each subpacket 218 may be encoded separately from every other subpacket 218 in a PHY layer packet 220 by re-initialization of the encoder before every subpacket. The independently encoded subpackets may also be and modulated independently. Further, both the start and end states of the encoder are known to a decoder used to decode the PHY layer packet 220. As such, each subpacket 218 may be decoded and, in some cases, demodulated separately from each other subpacket 218 in the PHY layer packet 220. A CRC 216 may be added to each subpacket 218 to which tail bits have been added, such that determination may be made as to whether each subpacket 218 has been decoded successfully, independently of each other subpacket 218 in the PHY layer packet 220, as described above.

In some configurations, convolutional coding with tail-biting is used. When tail-biting is used, no tail bits are added to the subpackets 218. Rather, the last, e.g., "Q" bits (where "Q" is representative of a predetermined number of bits), of a subpacket 218 are used to initialize the encoder, making the start and end states of the encoder identical, but not necessarily zero. By using the last "Q" bits of a subpacket 218 to initialize the encoder, each subpacket 218 may be encoded separately from every other subpacket 218 in a PHY layer packet 220 by cyclically applying convolutional coding to each subpacket 218. The independently encoded subpackets may also be modulated independently. With tail-biting encoding, the decoder knows that the start and end states of the encoder are identical but does not know what those states are. Thus, the decoder must be able to determine the start and end states in order to decode the subpacket, for example, by applying convolutional decoding on a repetition of the received subpacket 218. A decoder may be able to determine the start and end states of the subpackets 218 from information provided in the PHY layer header 228 and/or preamble 226. As such, each subpacket 218 may be decoded and, in some cases, demodulated separately from each other subpacket 218 in the PHY layer packet. When tail-biting is used, a CRC 216 may also be added to each subpacket 218, such that determination may be made as to whether each subpacket 218 has been decoded successfully, independently of each other subpacket 218 in the PHY layer packet 220, as described above.

In some cases, a low density parity code (LDPC) is applied to each of the subpackets 218 separately. In such a case, smaller LDPC blocks may be used toward the end of each subpacket 218. The inherent parity check performed by LDPC may be used at the receiver side in the same way as the additional CRC 216 suggested above for convolutional coding.

In addition to any of the above, smaller subpackets may be provided toward the end of a PHY layer packet 220, thereby further increasing error detection and decoding efficiency.

Figure 3:
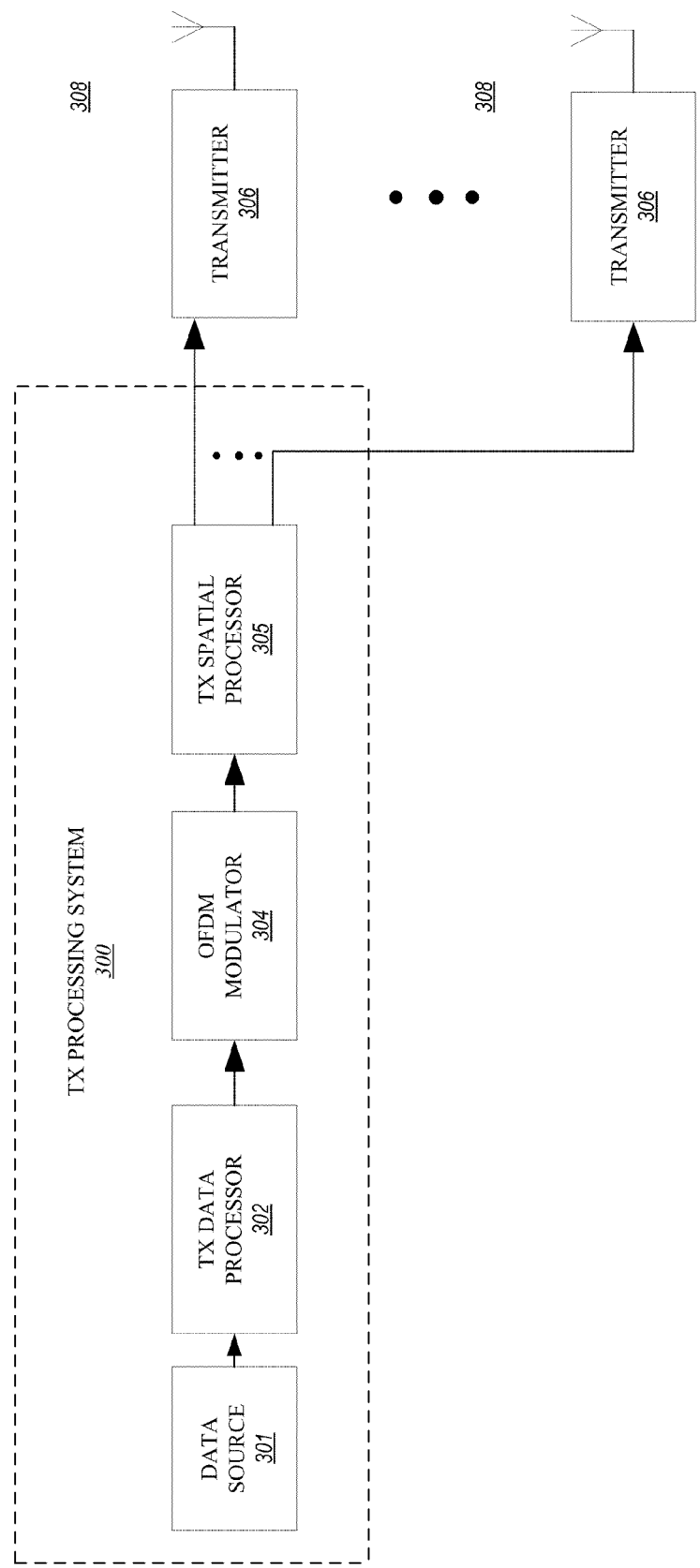
FIG. 3 is a block diagram of an example of signal processing functions of a PHY layer of a wireless node in the wireless communications network of FIG. 1.

FIG. 3 is a conceptual block diagram illustrating an example of the signal processing functions of the PHY layer when the wireless node is in a transmit mode. In this example, the signal processing functions are performed by a TX processing system 300. In the TX processing system 300, data is received by a TX data processor 302 from a data source 301. The received data may include data (or MAC) packets 210 from the MAC layer 204 of FIG. 2. The TX data processor 302 divides the data (or MAC) packets 210 into multiple portions (or subpackets) 218, may add the error detection code 216a to each of the subpackets 218, and assembles each of the subpackets 218 into a PHY layer packet 220, as shown in FIG. 2. The TX data processor 302 may be used to encode each of the subpackets 218 including the error detection code 216a separately from each of the other subpackets 218 in the PHY layer packet 220. The encoding process may include convolutional coding using tail bits or tail-biting, or LDPC, as explained above. The encoding process results in a sequence of code symbols for each subpacket 218 that may be blocked together and mapped to a signal constellation by the TX data processor 302 to produce a series of modulation symbols for each subpacket 218.

In wireless nodes implementing OFDM, the modulation symbols from the TX data processor 302 may be provided to an OFDM modulator 304. The OFDM modulator 304 splits the modulation symbols into parallel streams and maps each stream to an OFDM subcarrier. A TX spatial processor 305 performs spatial processing on the OFDM streams. This may be accomplished by spatially precoding $N_S$ parallel OFDM symbols per subcarrier, e.g., by multiplying the modulation symbols on an nth subcarrier by beamforming or an SDMA precoding matrix, e.g., W(n), which has $N_T$ by $N_S$ complex elements. The resulting $N_T$ spatially precoded streams are then transformed to the time domain by an IFFT 304a of the OFDM modulator 304 and sent to a different transmitter 306, each having a transmit antenna 308. Each transmitter 306 modulates an RF carrier with a respective precoded stream for transmission over the wireless channel and transmits the RF modulated streams via its respective transmit antenna 308.

After being applied to the OFDM modulator 304 and spatial processor 305, each series of modulation symbols representing a subpacket 218 may include, e.g., 1 to 4 OFDM symbols including an error detection code.

Similarly, the TX data processor 302 may split the incoming data stream into $N_S$ parallel streams and independently encode and modulate these streams, or portions of these streams, as described below with respect to a multiple-code word (MCW) mode.

The MIMO design has two modes of operation—single code word (SCW) and multiple-code word (MCW). In MCW mode, the transmitter can encode the data transmitted on each spatial stream independently. By way of example, as shown in TX processing system 400 of FIG. 4, a wireless node in a transmit mode may include $N_T$ ($N_T$=4 in this example) TX data processors 402a-402d which receive data from data source 401. Each TX data processor 402 processes and encodes the data received from the data source 401 similarly to as described above with respect to TX data processor 302, resulting in a series of modulation symbols produced by each TX data processor 402. In wireless nodes implementing OFDM, each TX data processor 402 may include an OFDM modulator, which splits the received modulation symbols into parallel OFDM streams. A TX spatial processor 403 performs spatial processing on the OFDM streams, which may be accomplished by spatially preceding $N_S$ parallel OFDM symbols per subcarrier, e.g., by multiplying the modulation symbols on an nth subcarrier by beamforming or an SDMA precoding matrix, which has $N_T$ by $N_S$ complex elements. The resulting $N_T$ spatially precoded streams are then transformed to the time domain by IFFTs 404a-404d and sent, respectively, to a different transmitter 406a-406d, each having a respective transmit antenna 408a-408d. Each transmitter 406 modulates an RF carrier with a respective precoded stream for transmission over the wireless channel and transmits the RF modulated streams via its respective transmit antenna 408. In some aspects, one or more OFDM modulators are provided separately from the TX data processors 402 for splitting the modulation symbols into streams. The streams are spatially processed by a spatial processor and transformed to the time domain by IFFTs included in the OFDM modulators to produce OFDM symbols or symbol streams for each of the spatially mapped streams.

The OFDM symbols or symbol streams are then separately sent to different transmitters, each having a respective antenna, as described above.

Figure 4:
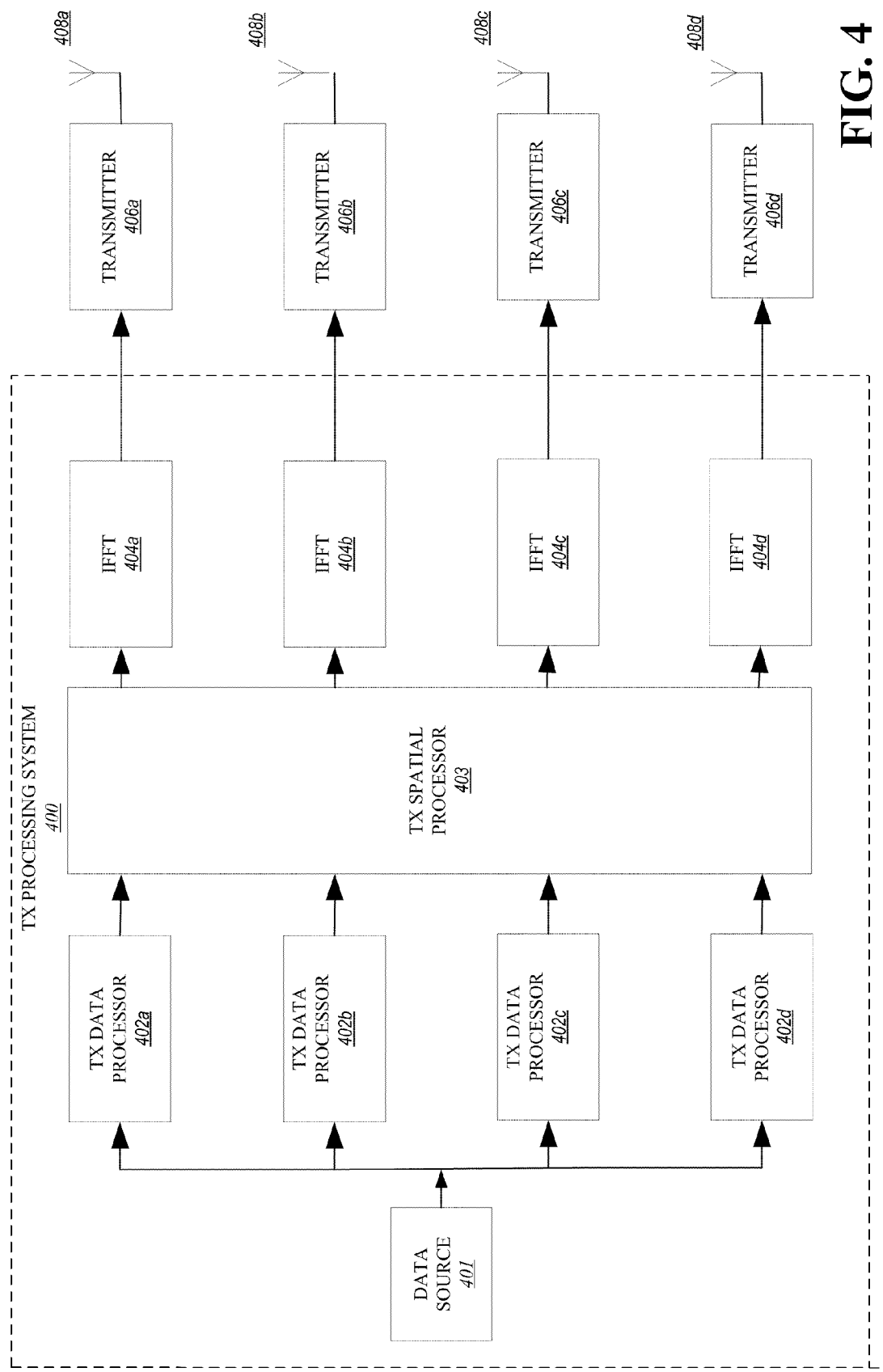
FIG. 4 is a block diagram illustrating an example of a multi-codeword (MCW) transmitter of a wireless node in the wireless communications network of FIG. 1.

The transmitters described above, e.g., 306 with respect to FIG. 3 and 406 with respect to FIG. 4, may be stand alone transmitters or may be integrated into any other component such as a transceiver.

In a MIMO communication system, at the receiver side, spatial streams transmitted by multiple ($N_T$) transmit antennas may be received by multiple ($N_R$) receive antennas of a receiver utilizing Successive Interference Cancellation (SIC). When the receiver utilizes SIC, the receiver decodes the data streams sequentially. The SIC processing technique attempts to recover the transmitted symbol streams, one at a time, using spatial or space-time receiver processing, and to cancel the interference due to each "recovered" symbol stream such that later recovered symbol streams experience less interference. A SIC algorithm works as follows: decode the first data stream, and then subtract its contribution from the received signal after re-encoding and multiplying the encoded first stream with an estimated channel state to remove interference from the second stream caused by the transmission of the first stream, thereby producing a modified symbol stream, then decode the second stream, and so on. SIC processing therefore includes a number of stages, one stage for each transmitted symbol stream to be recovered. Each stage (except for the last stage) recovers one of the transmitted symbol streams and cancels the interference due to this recovered symbol stream to derive modified symbol streams for the next stage. Each subsequently recovered symbol stream experiences less interference and is able to achieve a higher SNR than without the interference cancellation.

Figure 5:
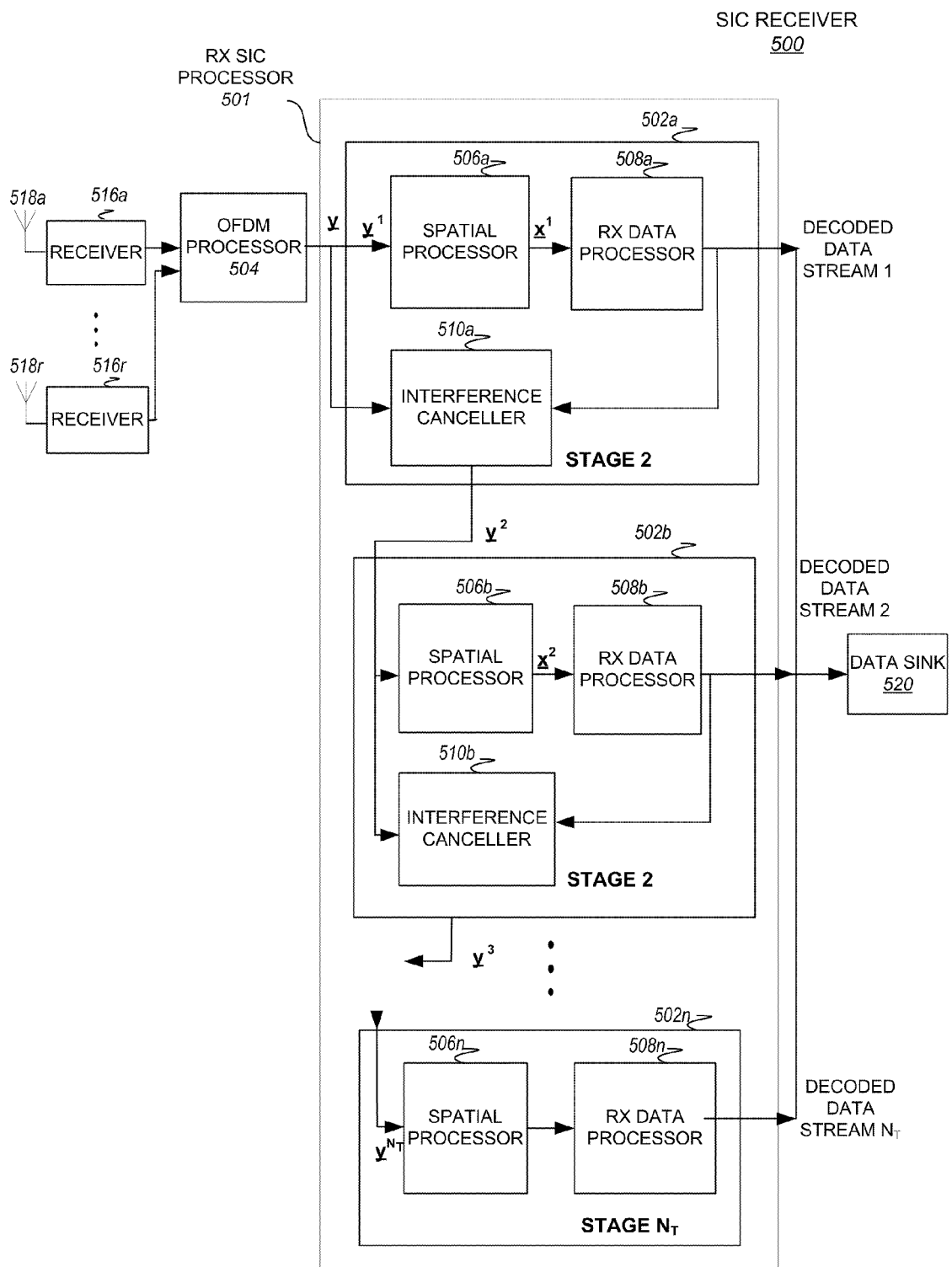
FIG. 5 is a block diagram illustrating an example of processing performed by a successive interference cancellation (SIC) receiver of a wireless node in the wireless communications network of FIG. 1.

The block diagram of FIG. 5 illustrates an example of processing performed by an RX processing system utilizing a SIC receiver 500 included in a wireless node in some configurations. The SIC receiver 500 includes $N_R$ receivers 516a-516r, each having a respective receive antenna 518a-518r. When the wireless node is in a receive mode, each of the $N_R$ receivers 516a-516r receives a signal transmitted from $N_T$ transmit antennas (such as transmit antennas 308 and 408 of FIGS. 3 and 4, respectively) through its respective antenna 518. The $N_R$ receivers 516a-516r condition (e.g., filter, amplify, and downconvert) a respective received signal, digitize the conditioned signal to provide samples, and further process (e.g., data demodulate) the samples to provide a stream of received transmission symbols. The received transmission symbol streams from all receivers 516 are then provided to RX OFDM processor 504.

RX OFDM processor 504 includes an FFT processor, which transforms each received OFDM symbol to provide a vector of $N_F$ received symbols for the $N_F$ frequency subchannels used for that symbol period. RX OFDM processor 504 then provides $N_R$ received symbol streams to RX SIC processor 501. Similar to TX processing system 400, which includes multiple, parallel IFFTs, RX OFDM processor 504 may also include multiple (e.g., $N_R$) FFT processors arranged in parallel to perform FFT processing.

The SIC receiver 500 may also include $N_S$ cascaded receiver processing stages 502a-502n for processing each received symbol stream. If $N_R$ spatial streams are received by the $N_R$ receive antennas of the SIC receiver 500, a SIC processing technique may be used to process the $N_R$ received symbol streams to detect the $N_S$ transmitted symbol streams. The $N_R$ received symbol streams are processed by the $N_S$ stages to successively recover one transmitted symbol stream at each stage. As each transmitted symbol stream is recovered, the interference it causes to the remaining not yet recovered symbol streams is estimated and canceled from the received symbol streams, and the "modified" symbol streams are further processed by a next stage to recover the next transmitted symbol stream. Recovery of the symbol streams is aided by the inclusion of an error detection code in each subpacket. For example, if each subpacket includes 1-4 symbols, a detection code is provided for each 1-4 symbols. Thus, only 1-4 symbols need to be decoded prior to determining whether the symbols have been decoded correctly, and an accurate interference estimate can be rapidly applied to (subtracted from) a next stage of symbols. Further, since the length of the symbol streams is reduced by coding and modulating each subpacket independently, only a reduced number of symbols to be recovered are included in each symbol stream. For example, when 1-4 symbols are included in each subpacket (as in the above example), a SIC receiver 500 need only buffer, at most, 1-4 symbols.

Each receiver processing stage 502 (except for the last stage 502n) includes a spatial processor 506, an RX data processor 508, and an interference canceller 510. The last stage 502n includes only spatial processor 506n and RX data processor 508n.

In the example, the received symbol streams are provided to the RX spatial processors 506a-506n, which perform spatial processing on the information to recover any spatial streams destined for that receiver. The spatial processing may be performed in accordance with Channel Correlation Matrix Inversion (CCMI), Minimum Mean Square Error (MMSE), or some other suitable technique. The RX data processors 508a-508n may be used to translate the modulation symbols back to the correct point in the signal constellation. Because of noise and other disturbances in the wireless channel, the modulation symbols may not correspond to an exact location of a point in the original signal constellation. The RX data processors 508a-508n detect which modulation symbol was most likely transmitted by finding the smallest distance between the received point and the location of a valid symbol in the signal constellation. These soft decisions may be used, in the case of Forward Error Correcting (FEC) codes, for example, to compute a Log-Likelihood Ratio (LLR) of the code symbols associated with the given modulation symbols. The RX data processors 508a-508n then use the sequence of code symbol LLRs in order to decode the data that was originally transmitted before providing the data to the MAC layer through a data sink 520.

For the first stage 502a, spatial processor 506a receives and processes the $N_R$ received symbol streams (denoted as the vector $y^1$) from the $N_R$ RX receivers 516a-516r, processed by the RX OFDM processor 504, based on a particular spatial or space-time receiver processing technique to provide $N_S$, with $N_S \leq N_T$, detected symbol streams (denoted as the vector x). For MIMO with OFDM, the $N_R$ received symbol streams comprise the received symbols for one frequency subchannel. The detected symbol stream corresponding to the lowest data rate, $x^1$, is selected and provided to RX data processor 508a. The RX data processor 508a further processes (e.g., demodulates, deinterleaves, and decodes) the detected symbol stream, $x^1$, selected for the first stage to provide a decoded data stream. Spatial processor 506a further provides an estimate of the channel response, which is used to perform the spatial or space-time processing for all stages.

The interference canceller 510a of the first stage 502a also receives the $N_R$ received symbol streams from receivers 516a-516r (i.e., the vector $y^1$). The interference canceller 510a further receives the decoded data stream from RX data processor 508a and performs the processing (e.g., encoding, interleaving, modulation, multiplication with the corresponding channel response, and so on) to derive $N_R$ remodulated symbol streams that are estimates of the interference components due to the just-recovered data stream. The remodulated symbol streams are then subtracted from the first stage's input symbol streams to derive $N_R$ modified symbol streams (denoted as the vector $y^1$), which include all but the subtracted (i.e., cancelled) interference components. The $N_R$ modified symbol streams are then provided to the next stage.

For each of the second through last stages 502b through 502n, the spatial processor 506 for that stage receives and processes the $N_R$ modified symbol streams from the interference canceller 510 in the preceding stage to derive the detected symbol stream for that stage. The detected symbol stream corresponding to the lowest data rate at that stage is selected and processed by the RX data processor 504 to provide the decoded data stream for that stage. For each of the second through second-to-last stages, the interference canceller 510 in that stage receives the $N_R$ modified symbol streams from the interference canceller 510 in the preceding stage and the decoded data stream from the RX data processor 508 within the same stage, derives $N_R$ remodulated symbol streams, and provides $N_R$ modified symbol streams for the next stage.

The receivers 516a-516r may be stand alone receivers or may be integrated into any other component such as a transceiver.

The SIC receiver 500 may utilize a pipelining technique for processing received symbol streams. Pipelining allows symbol streams to be processed in parallel, in which a first symbol stream is processed by a first stage, and then forwarded to a second stage for processing, and so on, as described above. When the first stage forwards the first symbol stream to the second stage, the first stage may begin processing a second symbol stream without waiting for processing of the first symbol stream to be complete. When the first stage has completed processing the second symbol stream and the second stage has completed processing the second symbol stream, the first stage may begin processing a third symbol stream, the second stage may begin processing the second symbol stream, and so on. Each stage of the SIC receiver 500 utilizing pipelining operates in a similar fashion, processing successive streams without waiting for all stages to complete processing of previously received streams.

In some configurations, each stream includes the same data packet, thereby allowing for beamforming and increased gain due to diversity. In some configurations, however, different data packets may be transmitted in each stream, thereby increasing bandwidth and higher throughput. Some other configurations may support a combination of spatial streams, some having the same data content and others having different data content.

Although aspects of the disclosure have been described with respect to a SIC receiver, the disclosure is not limited to such. For example, some aspects may utilize a MIMO detector such as a Zero Forcing (ZF), a Minimum Mean Square Error (MMSE), or a near-Maximum-Likelihood receiver.

FIG. 6 is a block diagram illustrating an example of the functionality of an apparatus for communication 600 according to an aspect of the disclosure. The apparatus for communication 600 includes a module 602 for generating a plurality of streams, each of the streams having a data packet comprising a plurality of portions, and a module 604 for coding and modulating each of the portions in each of the data packets independently of the other portions in the same data packet.

FIG. 7 is a block diagram illustrating an example of the functionality of an apparatus for communication 700 according to another aspect of the disclosure. The apparatus for communication 700 includes a module 702 for receiving a plurality of streams, wherein each of the streams includes a data packet comprising a plurality of portions with each of the portions in each of the data packets being coded and modulated independently of the other portions in the same data packet, and a module 704 for decoding and demodulating the data packets.

All of the elements, components and modules described herein may be implemented with one or more general purpose processors, digital signal processors (DSP)s, application specific integrated circuits (ASIC)s, field programmable gate array (FPGA)s, programmable logic devices (PLD)s, other programmable logic components, discrete gate or transistor logic, discrete hardware components, or any combination thereof designed to perform the functions described herein. A general purpose processor may be a microprocessor, a controller, a microcontroller, a state machine, or any other circuitry that can execute software. Software shall be construed broadly to mean instructions, data, or any combination thereof, whether referred to as software, firmware, middleware, microcode, hardware description language, or otherwise. Software may be stored on machine-readable media or embedded in one or more components such as a DSP or ASIC. Machine-readable media may include various memory components including, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. Machine-readable media may also be include a transmission line, a carrier wave modulated by data, and/or other means for providing software to the wireless node. The machine-readable media may be embodied in a computer-program product. The computer-program product may comprise packaging materials.

Whether the elements, components and modules described herein are implemented in hardware, software, or a combination thereof will depend upon the particular application and design constraints imposed on the overall system. Skilled artisans may implement the described functionality in varying ways for each particular application, but such implementation decisions should not be interpreted as causing a departure from the scope of the disclosure.

The previous description is provided to enable any person skilled in the art to fully understand the full scope of the disclosure. Modifications to the various configurations disclosed herein will be readily apparent to those skilled in the art. Thus, the claims are not intended to be limited to the various aspects of the disclosure contained herein, but is to be accorded the full scope consistent with the language of claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An apparatus for communication, comprising:
   a processing system configured to
      generate a plurality of streams, each of the streams having a data packet comprising a plurality of portions;
      code each of the portions in each of the data packets independently of the other portions in the same data packet to generate a plurality of independently coded portions for each data packet and independently modulate each independently coded portion of each data packet separately and independently from the other independently coded portions of the same data packet; and
      transmit the independently coded and modulated portions of the data packets for communicating each stream of the plurality of streams to one or more devices.

2. The apparatus of claim 1, wherein the processing system is further configured to transmit the independently coded portions of the data packets of each stream of the plurality of streams to different devices in a Space Division Multiple Access (SDMA) mode of transmission.

3. The apparatus of claim 1, wherein the processing system is further configured to transmit the independently coded portions of the data packets of multiple streams to the same device in a Multiple Input Multiple Output (MIMO) mode of transmission.

4. The apparatus of claim 1, wherein the processing system is further configured to transmit the independently coded portions of the data packets of subsets of streams to different devices in a Space Division Multiple Access (SDMA) mode of transmission, wherein a plurality of modulated symbols of the data packets for each subset of streams are transmitted to a device in a Multiple Input Multiple Output (MIMO) mode of transmission.

5. The apparatus of claim 1, wherein the processing system is further configured to transmit a combination of the independently coded portions of the data packets of single streams and the independently coded portions of the data packets of multiple streams to different devices in a Space Division Multiple Access (SDMA) mode of transmission.

6. The apparatus of claim 1 wherein the processing system is further configured to provide an error detection code for each of the independently coded portions in each of the data packets.

7. The apparatus of claim 6 wherein each of the error detection codes comprises a Cyclical Redundancy Check (CRC) code.

8. The apparatus of claim 1 wherein the processing system is further configured to provide one or more tail bits for each of the independently coded portions in each of the data packets.

9. The apparatus of claim 1 wherein the processing system is further configured to provide tail biting encoding for each of the independently coded portions in each of the data packets.

10. The apparatus of claim 1 wherein the independently coded portions toward the end of each of the data packets are smaller than the other independently coded portions.

11. The apparatus of claim 1 wherein the processing system is further configured to provide demarcation for each of the independently coded portions in each of the data packets.

12. The apparatus of claim 1 wherein each of the data packets comprises a Media Access Control (MAC) layer packet.

13. The apparatus of claim 1 wherein each of the independently coded portions in each of the data packets comprises at least one Orthogonal Frequency-Division Multiplexing (OFDM) symbol.

14. The apparatus of claim 1 wherein each of the independently coded portions in each of the data packets comprises a plurality of subcarriers in a plurality of Orthogonal Frequency-Division Multiplexing (OFDM) symbols.

15. The apparatus of claim 1 further comprising a plurality of antennas, the processing system being further configured to provide each of the streams to a subset of the antennas for transmission.

16. An apparatus for communications, comprising:
    a processing system configured to
       receive a plurality of streams, wherein each of the streams includes a data packet comprising a plurality of portions, with each of the portions in each of the data packets being coded independently of the other portions in the same data packet and with each of the portions in each of the received data packets being independently modulated; and
       demodulate and decode the independently coded and modulated portions of the data packets for recovering one or more of the streams.

17. The apparatus of claim 16, wherein the processing system is further configured to recover streams intended for different devices receiving multiple streams by performing MIMO detection and/or interference cancellation.

18. The apparatus of claim 16 wherein each of the independently coded portions of each of the data packets includes an error detection code, the processing system being further configured to use the error detection codes to decode and check for errors for each of the independently coded portions of each of the data packets.

19. The apparatus of claim 18 wherein each of the error detection codes comprises a Cyclical Redundancy Check (CRC) code.

20. The apparatus of claim 16 wherein each of the independently coded portions for each of the data packets includes one or more tail bits, the processing system being further configured to use the tail bits to decode each of the independently coded portions for each of the data packets.

21. The apparatus of claim 16 wherein each of the independently coded portions for each of the data packets includes tail biting encoding, the processing system being further configured to use the tail biting to decode each of the independently coded portions for each of the data packets.

22. The apparatus of claim 16 wherein the independently coded portions towards the end of each of the data packets are smaller than the other independently coded portions, the processing system being further configured to use the smaller independently coded portions to decode the data packets.

23. The apparatus of claim 16 wherein each of the independently coded portions for each of the data packets includes demarcation, the processing system being further configured to use the demarcations to decode each of the independently coded portions for each of the data packets.

24. The apparatus of claim 16 wherein each of the data packets comprises a Media Access Control (MAC) layer packet.

25. The apparatus of claim 16 wherein each of the independently coded portions in each of the data packets comprises at least one Orthogonal Frequency-Division Multiplexing (OFDM) symbol.

26. The apparatus of claim 16 wherein the processing system comprises a Successive Interference Cancellation (SIC) receiver.

27. The apparatus of claim 16 wherein the processing system comprises a Multiple Input Multiple Output (MIMO) detector including any of a Zero Forcing (ZF), a Minimum Mean Square Error (MMSE), and a near-Maximum-Likelihood receiver.

28. The apparatus of claim 16 wherein the processing system is further configured to demodulate and decode the independently coded portions of the data packets in the streams in a pipeline fashion.

29. A method for communication, comprising:
generating a plurality of streams, each of the streams having a data packet comprising a plurality of portions;
coding each of the portions in each of the data packets independently of the other portions in the same data packet to generate a plurality of independently coded portions for each data packet and independently modulating each independently coded portion of each data packet separately and independently from the other independently coded portions of the same data packet; and
transmitting the independently coded and modulated portions of the data packets for communicating each stream of the plurality of streams to one or more devices.

30. The method of claim 29 further comprising providing an error detection code for each of the independently coded portions in each of the data packets.

31. The method of claim 30 wherein each of the error detection codes comprises a Cyclical Redundancy Check (CRC) code.

32. The method of claim 29 further comprising providing one or more tail bits for each of the independently coded portions in each of the data packets.

33. The method of claim 29 further comprising providing a tail biting for each of the independently coded portions in each of the data packets.

34. The method of claim 29 wherein the independently coded portions toward the end of each of the data packets are smaller than the other independently coded portions.

35. The method of claim 29 further comprising providing demarcation for each of the independently coded portions in each of the data packets.

36. The method of claim 29 wherein each of the data packets comprises a Media Access Control (MAC) layer packet.

37. The method of claim 29 wherein each of the independently coded portions in each of the data packets comprises a plurality of Orthogonal Frequency-Division Multiplexing (OFDM) symbols.

38. The method of claim 29 wherein each of the independently coded portions in each of the data packets comprises a plurality of subcarriers in a plurality of Orthogonal Frequency-Division Multiplexing (OFDM) symbols.

39. The method of claim 29 further comprising providing each of the streams to a different one of a plurality of antennas for transmission.

40. A method for communication, comprising:
receiving a plurality of streams, wherein each of the streams includes a data packet comprising a plurality of portions, with each of the portions in each of the data packets being coded independently of the other portions in the same data packet and with each of the portions in each of the received data packets being independently modulated; and
decoding the independently coded and modulated portions of the data packets for recovering one or more of the streams.

41. The method of claim 40 wherein each of the independently coded portions of each of the data packets includes an error detection code, the method further comprising using the error detection codes to decode and check for errors in each of the independently coded portions of each of the data packets.

42. The method of claim 41 wherein each of the error detection codes comprises a Cyclical Redundancy Check (CRC) code.

43. The method of claim 40 wherein each of the independently coded portions of each of the data packets includes one or more tail bits, the method further comprising using the tail bits to decode each of the independently coded portions of each of the data packets.

44. The method of claim 40 wherein each of the independently coded portions of each of the data packets includes tail biting encoding, the method further comprising using the tail biting to decode each of the independently coded portions for each of the data packets.

45. The method of claim 40 wherein the independently coded portions towards the end of each of the data packets are smaller than the other independently coded portions, the method further comprising using the smaller independently coded portions to decode the data packets.

46. The method of claim 40 wherein each of the independently coded portions in each of the data packets includes demarcation, the method further comprising using the demarcations to decode each of the independently coded portions for each of the data packets.

47. The method of claim 40 wherein each of the data packets comprises a Media Access Control (MAC) layer packet.

48. The method of claim 40 wherein each of the independently coded portions in each of the data packets comprises a plurality of Orthogonal Frequency-Division Multiplexing (OFDM) symbols.

49. The method of claim 40 further comprising receiving with any of a Successive Interference Cancellation (SIC) receiver, a Zero Forcing (ZF) receiver, a Minimum Mean Square Error (MMSE) receiver, and a near-Maximum-Likelihood receiver.

50. The method of claim 40 further comprising demodulating and decoding the independently coded portions of the data packets in the streams in a pipeline fashion.

51. An apparatus for communication, comprising:
means for generating a plurality of streams, each of the streams having a data packet comprising a plurality of portions;
means for coding each of the portions in each of the data packets independently of the other portions in the same data packet to generate a plurality of independently coded portions for each data packet and independently modulating each independently coded portion of each data packet separately and independently from the other independently coded portions of the same data packet; and
means for transmitting the independently coded and modulated portions of the data packets for communicating each stream of the plurality of streams to one or more devices.

52. The apparatus of claim 51 further comprising means for providing error detection code for each of the independently coded portions in each of the data packets.

53. The apparatus of claim 52 wherein each of the error detection codes comprises a Cyclical Redundancy Check (CRC) code.

54. The apparatus of claim 51 further comprising means for providing one or more tail bits for each of the independently coded portions in each of the data packets.

55. The apparatus of claim 51 further comprising means for providing tail biting encoding for each of the independently coded portions in each of the data packets.

56. The apparatus of claim 51 wherein the independently coded portions toward the end of each of the data packets are smaller than the other independently coded portions.

57. The apparatus of claim 51 further comprising means for providing demarcation for each of the independently coded portions in each of the data packets.

58. The apparatus of claim 51 wherein each of the data packets comprises a Media Access Control (MAC) layer packet.

59. The apparatus of claim 51 wherein each of the independently coded portions in each of the data packets comprises a plurality of Orthogonal Frequency-Division Multiplexing (OFDM) symbols.

60. The apparatus of claim 51 wherein each of the independently coded portions in each of the data packets comprises a plurality of subcarriers in plurality of Orthogonal Frequency-Division Multiplexing (OFDM) symbols.

61. The apparatus of claim 51 further comprising means for providing each of the streams to a different one of a plurality of antennas for transmission.

62. An apparatus for communication, comprising:
means for receiving a plurality of streams, wherein each of the streams includes a data packet comprising a plurality of portions, with each of the portions in each of the data packets being coded independently of the other portions in the same data packet and with each of the portions in each of the received data packets being independently modulated; and
means for decoding each of the independently coded and modulated portions for each of the data packets for recovering one or more of the streams.

63. The apparatus of claim 62 wherein each of the independently coded portions of each of the data packets includes error detection code, the apparatus further comprising means for using the error detection codes to decode and check for errors in each of the independently coded portions for each of the data packets.

64. The apparatus of claim 63 wherein each of the error detection codes comprises a Cyclical Redundancy Check (CRC) code.

65. The apparatus of claim 62 wherein each of the independently coded portions of each of the data packets includes one or more tail bits, the apparatus further comprising means for using the tail bits to decode each of the independently coded portions for each of the data packets.

66. The apparatus of claim 62 wherein each of the independently coded portions of each of the data packets includes tail biting encoding, the apparatus further comprising means for using the tail biting to decode each of the independently coded portions for each of the data packets.

67. The apparatus of claim 62 wherein the independently coded portions towards the end of each of the data packets are smaller than the other independently coded portions, the apparatus further comprising means for using the smaller independently coded portions to decode the data packets.

68. The apparatus of claim 62 wherein each of the independently coded portions of each of the data packets includes demarcation, the apparatus further comprising means for using the demarcations to decode each of the independently coded portions for each of the data packets.

69. The apparatus of claim 62 wherein each of the data packets comprises a Media Access Control (MAC) layer packet.

70. The apparatus of claim 62 wherein each of the independently coded portions in each of the data packets comprises a plurality of Orthogonal Frequency-Division Multiplexing (OFDM) symbols.

71. The apparatus of claim 62 further comprising means for receiving with any of a Successive Interference Cancellation (SIC) receiver, a Zero Forcing (ZF) receiver, a Minimum Mean Square Error (MMSE) receiver, and a near-Maximum-Likelihood receiver.

72. The apparatus of claim 62 further comprising means for demodulating and decoding the independently coded portions of the data packets in the streams in a pipeline fashion.

73. A computer-program product for communication, comprising:
a non-transitory machine-readable medium encoded with instructions executable to:
generate a plurality of streams, each of the streams having a data packet comprising a plurality of portions;
code each of the portions in each of the data packets independently of the other portions in the same data packet to generate a plurality of independently coded portions for each data packet and independently modulate each independently coded portion of each data packet separately and independently from the other independently coded portions of the same data packet; and
transmit the independently coded and modulated portions of the data packets for communicating each stream of the plurality of streams to one or more devices.

74. A computer-program product for communication, comprising:
a non-transitory machine-readable medium encoded with instructions executable to:
receive a plurality of streams, wherein each of the streams includes a data packet comprising a plurality of portions, with each of the portions in each of the data packets being coded independently of the other portions in the same data packet and with each of the portions in each of the received data packets being independently modulated; and demodulate and decode each of the independently coded and modulated portions for each of the data packets for recovering one or more of the streams.

75. An access terminal, comprising:
a processing system configured to
  generate a plurality of streams, each of the streams having a data packet comprising a plurality of portions;
  code each of the portions in each of the data packets independently of the other portions in the same data packet to generate a plurality of independently coded portions for each data packet and independently modulating each independently coded portion of each data packet separately and independently from the other independently coded portions of the same data packet; and
  transmit the independently coded and modulated portions of the data packets for communicating each stream of the plurality of streams to one or more devices; and
a user interface supported by the processing system.

76. An access point, comprising:
a wireless network adapter configured to support a backhaul connection to a network; and
a processing system configured to
  receive a plurality of streams, wherein each of the streams includes a data packet comprising a plurality of portions, with each of the portions in each of the data packets being coded independently of the other portions in the same data packet and with each of the portions in each of the received data packets being independently modulated; and
  demodulate and decode each of the independently coded and modulated portions for each of the data packets for recovering one or more of the streams.

77. An access terminal, comprising:
a processing system configured to
  receive a plurality of streams, wherein each of the streams includes a data packet comprising a plurality of portions, with each of the portions in each of the data packets being coded independently of the other portions in the same data packet and with each of the portions in each of the received data packets being independently modulated; and
  demodulate and decode each of the independently coded and modulated portions for each of the data packets for recovering one or more of the streams; and
a user interface supported by the processing system.

78. An access point, comprising:
a wireless network adapter configured to support a backhaul connection for a peer node to a network; and
a processing system configured to
  generate a plurality of streams, each of the streams having a data packet comprising a plurality of portions;
  code each of the portions in each of the data packets independently of the other portions in the same data packet to generate a plurality of independently coded portions for each data packet and independently modulate each independently coded portion of each data packet separately and independently from the other independently coded portions of the same data packet; and
  transmit the independently coded and modulated portions of the data packets for communicating each stream of the plurality of streams to one or more devices.

79. An apparatus for wireless communication, comprising:
a processing system configured to
  generate a plurality of streams, each of the streams including at least one Media Access Control (MAC) layer data packet,
  divide the MAC layer data packet into a plurality of portions,
  code each of the portions of the MAC layer data packet independently of the other portions in the said data packet to generate a plurality of independently coded portions for each MAC layer data packet,
  provide tail biting encoding for each of the independently coded portions in the MAC layer data packet and independently modulate each independently coded portion of each data packet separately and independently from the other independently coded portions of the same data packet, and
  transmit the independently coded and modulated portions of the MAC layer data packets for communicating each stream of the plurality of streams to one or more devices.

* * * * *